(12) United States Patent
Khan

(10) Patent No.: US 11,988,827 B2
(45) Date of Patent: May 21, 2024

(54) METHOD AND SYSTEM FOR DISPLAYING IMAGES

(71) Applicant: COGNI TRAX, Santa Clara, CA (US)

(72) Inventor: Sajjad Ali Khan, Santa Clara, CA (US)

(73) Assignee: Cogni Trax, Santa Clara, CA (US)

( * ) Notice: Subject to any disclaimer, the term of this patent is extended or adjusted under 35 U.S.C. 154(b) by 1059 days.

(21) Appl. No.: 16/486,606

(22) PCT Filed: Feb. 16, 2018

(86) PCT No.: PCT/US2018/000016
§ 371 (c)(1),
(2) Date: Aug. 16, 2019

(87) PCT Pub. No.: WO2018/151807
PCT Pub. Date: Aug. 23, 2018

(65) Prior Publication Data
US 2023/0135730 A1    May 4, 2023

(51) Int. Cl.
*G02B 26/00* (2006.01)
*G02B 26/10* (2006.01)
*G02B 27/01* (2006.01)

(52) U.S. Cl.
CPC ....... *G02B 26/105* (2013.01); *G02B 27/0172* (2013.01); *G02B 2027/0123* (2013.01);
(Continued)

(58) Field of Classification Search
CPC .......................... G02B 27/01; G02B 27/0101; G02B 27/0103; G02B 27/0149; G02B 27/017; G02B 27/0172; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123;
(Continued)

(56) References Cited

U.S. PATENT DOCUMENTS 9,335,548 B1 * 5/2016 Cakmakci .......... G02B 27/0172
2012/0212399 A1 * 8/2012 Border ............... G02B 27/0172
345/8

(Continued)

*Primary Examiner* — James C. Jones
*Assistant Examiner* — Henry Duong

(57) ABSTRACT

A head mounted display with wide field of view (WFOV) is disclosed. A conventional small display is used in conjunction with a Beam Steering Mechanism (BSM) to dynamically steer the FOV of the displayed image at a very fast rate to provide an effectively WFOV for immersive visual experience. An electrically actuated switchable Steering Mechanism (SM) is provided within the display projection module that steers the projected image towards different portions of the lens at a fast rate. The steering can be either in one, two or three dimensions. The steering allows for the displayed image to be wider field of view (FOV) to the observer than conventionally projected images that are small fixed FOV. The SM is steered at a high rate so as to be indistinguishable to the human observer. The steering can be controlled in a gaze tracked dynamic, on-demand fashion so as to save power consumed by the display system.

14 Claims, 9 Drawing Sheets

(52) U.S. Cl.
CPC ............... *G02B 2027/0138* (2013.01); *G02B 2027/0187* (2013.01)

(58) Field of Classification Search
CPC .... G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0178; G02B 2027/0181; G02B 2027/0183; G02B 2027/0185; G02B 2027/0187; G02B 2027/019; G02B 2027/0192; G02B 2027/0194; G02B 2027/0196; G02B 2027/0198; G02B 26/105; G02B 5/30; G02B 26/10
USPC .......................................................... 359/630
See application file for complete search history.

(56) References Cited

U.S. PATENT DOCUMENTS

| | | | |
|---|---|---|---|
| 2012/0218301 A1* | 8/2012 | Miller | G06Q 30/02 345/633 |
| 2014/0306878 A1* | 10/2014 | Bhakta | G06F 3/013 345/156 |
| 2016/0349514 A1* | 12/2016 | Alexander | G02B 5/32 |
| 2018/0149862 A1* | 5/2018 | Kessler | G02B 27/0172 |
| 2020/0186761 A1* | 6/2020 | Greenberg | G02B 27/283 |

\* cited by examiner

METHOD AND SYSTEM FOR DISPLAYING IMAGES

This application claims priority to U.S. provisional patent application No. 62/460,659, filed on Feb. 17, 2017, and Paris Cooperation Treaty (PCT) Application No. PCT/US2018/000016 filed on Feb. 16, 2018 which are hereby incorporated by reference here in entirety.

TECHNICAL FIELD

This relates generally to a system and method for displaying images, and more particularly, to Head Mounted Displays (HMD) and Near Eye Displays (NED) such as used in Augmented Reality, Virtual Reality or Mixed Reality applications.

BACKGROUND

Head mounted devices often include displays. These are used in Augmented Reality, Virtual Reality or Mixed Reality applications. The screen size visible to the user in these applications is normally called Field Of View (FOV). The FOV is determined by the physical size of the display used and the light emission angle collected by the optics that are used to project the image light into pupil of the human observer. In general, to provide Wide FOV (WFOV), it may be burdensome for conventional display technologies because the display size as well as the optics needed to collect light from the larger display grow significantly in size, rendering the whole headset very large, bulky and impractical to mount on the user's head. Moreover, since power consumption is also related to the size of the display, hence the wider FOV increases the power consumption and therefore the required battery size becomes larger, rendering such solutions impractical for a HMD application.

FIG. 1(a) shows a prior art HMD architecture 100. It consists of a display 110, pupil forming optics 120, combiner optics 130, and an exit pupil 140. A viewer's eye is represented by 150. The display 110 emits light with finite divergence angles as represented by rays 112, 114 and 116. The pupil forming optics 120 transform the image from image space to angular space by collimating the diverging rays 112, 114 and 116 into collimated beams 122, 124 and 126 respectively. A combiner optic 130 partially reflects these collimated beams to form an exit pupil 140 for the observer's eye 150. The collimated beams forming the exit pupil at 140 subtend an angle that equates to a visible FOV 150 to the observer. FIG. 1(b) shows a prior art HMD architecture's FOV layout 102. The observer 170 can experience only a narrow FOV 160 as seen via the exit pupil 140. Since the FOV is determined by the physical size of the display used and the light emission angle collected by the optics that are used to project the image light into pupil of the human observer, hence in order to provide Wide FOV, either the display size or the emission cone angle has to increase. It is hence cost and size prohibitive to increase the size of the display in order to achieve a WFOV. The larger size also makes the headset bulky and heavy and hence impractical. The larger size also impacts power consumption and battery life adversely.

It would therefore be desirable to provide improved displays for HMD electronic devices that provide WFOV without significantly increasing the size and cost of the headset while still utilizing low power.

SUMMARY

According to the present invention, a conventional display is used in conjunction with a Beam Steering Mechanism (BSM) to dynamically steer the FOV of the displayed image at a very fast rate to provide an effectively WFOV to the user as compared to the FOV of a conventional non-steered display. An electrically actuated switchable Steering Mechanism (SM) is provided within the display projection module that steers the projected image towards different portions of the lens. The steering can be either in one, two or three dimensions. The steering allows for the displayed image to be wider field of view (FOV) to the observer than conventionally projected images that are small fixed FOV. The SM is controlled at a high rate so as to be indistinguishable to the human observer. The steering can be controlled in a dynamic, on-demand fashion so as to save power consumed by the display system.

In another embodiment, the display is switched at a fast rate such that there are, for example, N sub-frames in a single frame time. Each of the N sub-frames corresponds to a different portion of the FOV so as to increase the time-averaged effective FOV for the observer by N times. As can be seen, the FOV can be increased N times if the micro-display is run with N sub-frames in a single frame time. A variety of mechanisms can be utilized for steering the FOV, including but not limited to galvanometric, electrostatic, electromagnetic, piezoelectric and liquid crystal based. The number N will depend on the speed of the technology chosen for the display, e.g.: most conventional Liquid Crystal on Silicon (LCoS) micro displays are slow, of the order of a few to several milliseconds whereas DLP MEMS micro-displays can be run at a much faster rate such as KHz and hence can hence enable a lot wider FOV due their speed advantage. Ferroelectric Liquid Crystal on Silicon (FLCoS) devices are also capable of fast frame rates although they suffer from voltage DC-balancing requirements and can only enable a total available duty cycle of about 50% as opposed to 100% for DLP systems.

Conventional HMD architectures utilize a simple pupil forming optical approach. A display with finite size and light emission angle is used with a set of pupil-forming optics to form an exit pupil in front of the user's eye. The FOV visible to the user is governed by fundamental etendue equations, such as the Lagrange invariant or the Optical invariant. So, in order to achieve a wide FOV, a larger display panel is needed.

To overcome the requirement of larger display panel size for achieving a wide FOV, an intelligent solution is to use a small conventional sized display panel. Conventional optics are used to first form an intermediate pupil. A BSM is placed at this intermediate pupil location. The BSM is actively steered towards different angular directions in a time sequence. A set of pupil relaying optics is used to relay the steered intermediate pupil from the BSM location to the user's eye.

The display can be chosen from amongst one of the following options: Liquid Crystal on Silicon, Micro Electro Mechanical Systems, Digital Light Processing Digital Micromirror Device, Micro Organic Light Emitting Diode, Micro Light Emitting Diode, Micro Electro Mechanical Systems Resonant Scanning Mirror, or Bulk-Micro-Machined Resonant Scanning Mirror.

In one embodiment, a controller is configured such that it supplies image data at a frame rate of $1/t_{fr}$ to a display where $t_{fr}$ is the time period for a single frame of image data. Pupil forming optics are located at a first distance from the said display that are configured to receive the optical image from the said display and form an intermediate pupil located at a second distance away from the said pupil forming optics. The said intermediate pupil has a half-cone divergence angle of $\alpha_{1/2}$. A BSM is located at the said intermediate pupil location that steers the said intermediate pupil into N discrete angular directions around a nominal axis at an interval of $t_{fl}/N$ where N is an integer. The net FOV achieved with such dynamic beam steering is $2N\alpha_{1/2}$. The said BSM is also connected to the controller for appropriate timing. The BSM can provide one, two or three-dimensional steering capability. A combiner optic is located at a third distance from the said BSM, wherein the combiner optic is configured to receive the said steered beam of light and it redirects the said steered beam of light to the viewer's eye. The viewer's eye is located at a fourth distance from the said combiner optic.

An appropriate Combiner Optic (CO) may be used to overlay the virtual content from the display on top of a real-world scene. This method allows for an effectively WFOV display. The CO may comprise at least one of the following: Partially reflective/transmissive mirrors, Partially Reflective Thin Film Coatings, Multilayer Optical Films, Reflective Polarizers, Notch Reflective Polarizers, Bragg Reflective Polarizers, Surface Relief Gratings, Diamond Ruled Gratings, Volume Phase Gratings, Holographic Gratings, Volume multiplexed Holographic Gratings, Angle multiplexed Holographic Gratings, Polarization multiplexed Holographic Gratings, Liquid Crystal Gratings, Polymerized Liquid Crystal Gratings, or any combination thereof.

The pupil forming optics are designed with a focal length equal to the first distance and the second distance. This allows the transformation of the image into angular space.

The BSM can be more than one dimensional beam steering mechanism including piston type analog phase for controlling the dimension of depth. This will allow for controlling the location of the virtual image at a certain distance away from the viewer. Alternately, a tunable focus element such as an electrowetting lens, a flexible membrane lens or mirror, or an Adaptive Optics membrane mirror may also be placed in the intermediate pupil location to achieve the functionality of variable focal distance.

The combiner optic may have an optical power where it's focal length is equal to half the said third distance. This can be done via a partially reflective coating on a curved substrate that is very thin and doesn't impart any optical power in the transmissive geometry.

The combiner optic maybe designed such that the said third distance is equal to the said fourth distance. The third and fourth distances are designed to be classical 1:1 magnification geometry of 2F where F is the focal length of the CO element.

The combiner optic may also have a switchable tint control mechanism to allow for dimming of the real-world scene as seen through the CO. This allows for controlling the dynamic range and relative brightens of the scene and the virtual content as shown by the display.

In another embodiment, a controller is connected to a camera sensor, a display and a BSM. The camera is pointed towards the viewer's eye to detect the viewer's gaze direction. Once the controller determines the gaze direction of the viewer from the camera signal, it sends a direction steering command to the BSM, and a direction appropriate image to the display. Once, the BSM has switched its position per the controller command, the display then projects the new direction specific image into the CO which directs it to the viewer. The display in the said embodiment, may be a color sequential display illuminated by multiple color illumination sources in a time sequence. The illumination sources may include an Infrared source for illuminating the viewer's eye for gaze detection purposes. Accordingly, the combiner optic may be designed to function as a combiner across a broad wavelength band including Infrared so that it can route the infrared light from the illumination source towards the viewer's eye.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

A head mounted display is disclosed, the HMD having for each eye of the user a display module that comprises of the following elements: a controller, a display, a BSM, a combiner optic. The present invention will now be described by way of illustrative, but non-limiting examples with reference to the accompanying drawings.

Figure 1A:
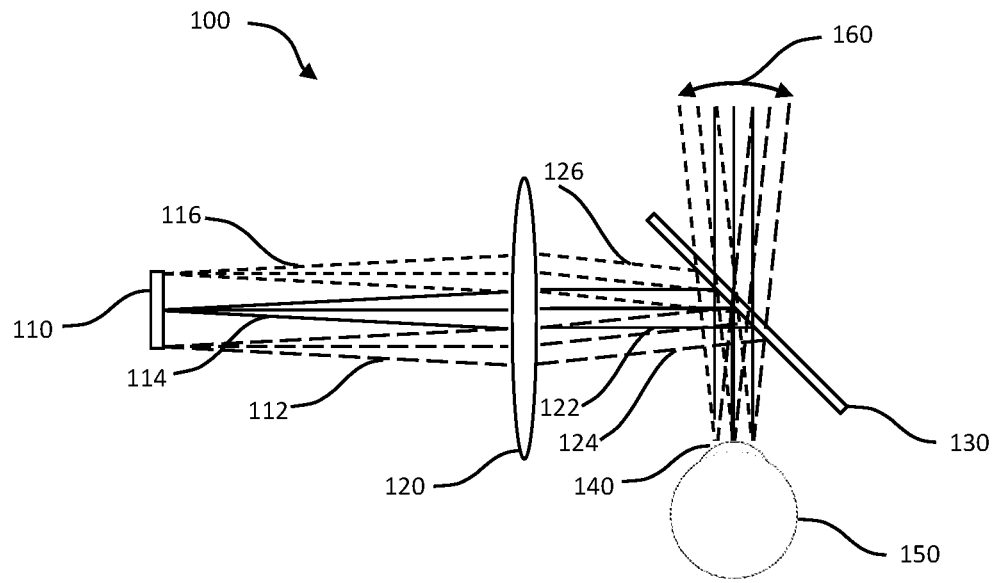
FIG. 1. Prior art Head Mounted Display Architecture.
Figure 1B:
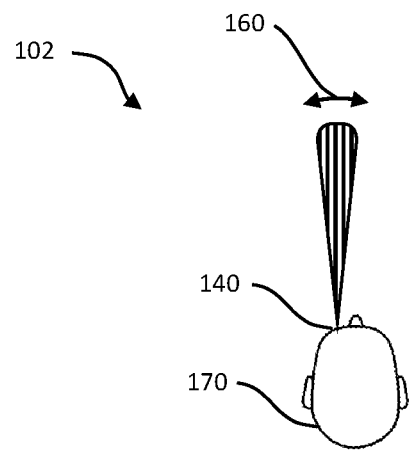
Figure 2:
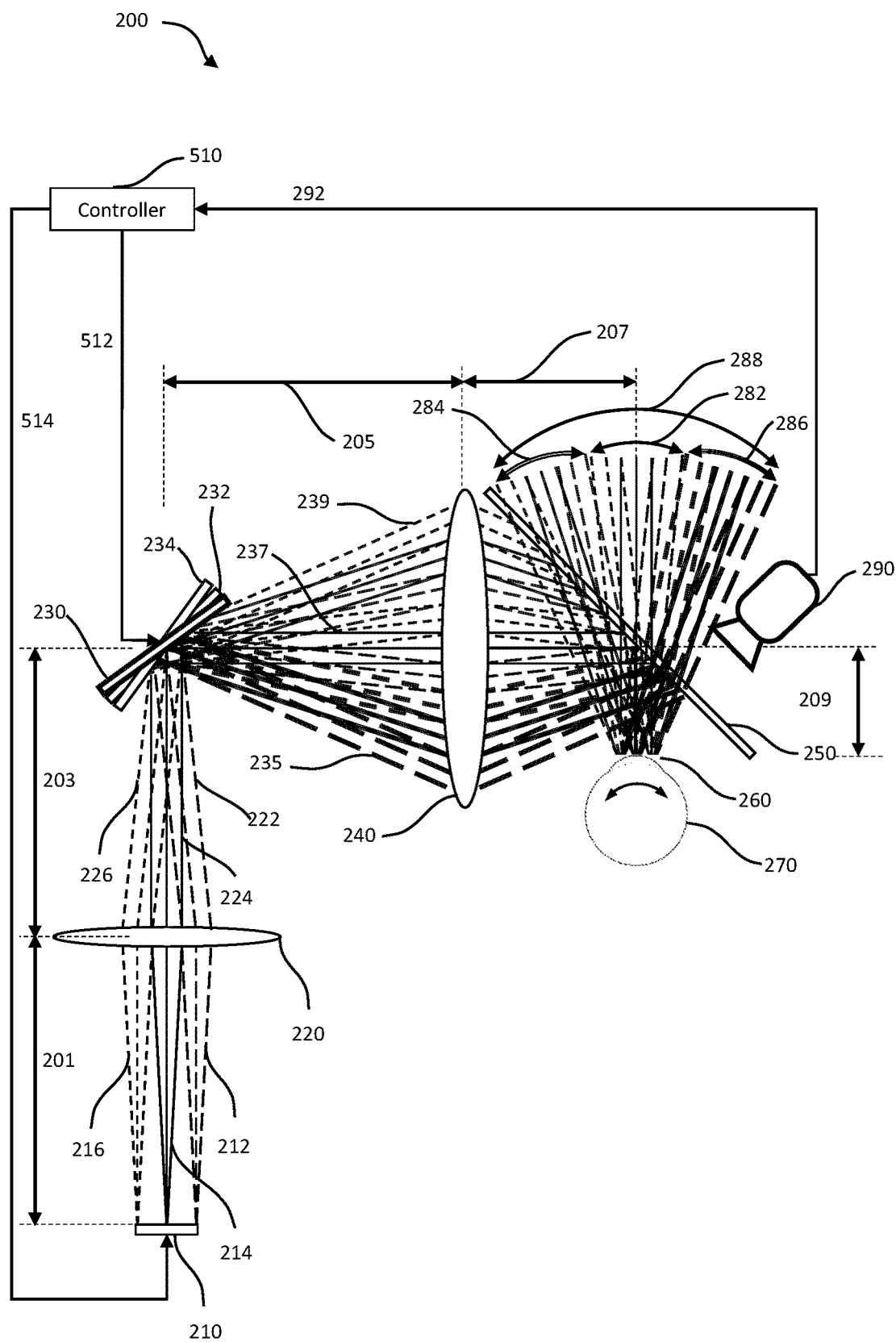
FIG. 2. State-of-the-art Head Mounted Display Architecture.

FIG. 2 shows our state-of-the-art HMD architecture 200 to achieve a WFOV without significantly increasing the cost and size of the optical system. It consists of a display 210, intermediate pupil forming optics 220, a BSM 230, relay optics 240, combiner optics 250, and an exit pupil 260. A viewer's eye is represented by 270. The intermediate pupil forming optics 220 are located at distances 201 and 203 away from the display 210 and the BSM 230 respectively. These distances are designed to be equal to the focal length of the intermediate pupil forming optics 220. The display 210 emits light with finite divergence angles as represented by rays 212, 214 and 216. The intermediate pupil forming optics 220 transform the image from image space to angular space by collimating the diverging rays 212, 214 and 216 into collimated beams 222, 224 and 226 respectively. The collection of these collimated rays 222, 224 and 226 subtends an angle at the intermediate pupil location. The BSM 230, steers this intermediate pupil into discrete angular directions in time domain as represented by the change in angular orientation of the BSM 232 and 234. The outgoing beams emerging from BSM 230, 232 and 234 are represented by rays with cone angles of 235, 237 and 239 respectively.

Relay optics 240 relay the intermediate pupil from the BSM 230, 232 and 234 to form an exit pupil 260 for the observer's eye 270. The relay optics 240 may have simple 1:1 magnification such that the distance 205 is equal to the sum of distances 207 and 209. The relay optic 240 has a focal length that is equal to half of the distance 205 enabling a classical 2F-2F configuration. The combiner optics 250 partially reflects these collimated beams to form an exit pupil 260 for the observer's eye 270. The observer sees a time-sequenced FOV of 280, 282 and 284 that corresponds to the three different locations 230, 232 and 234 of the BSM respectively. Since the time-sequenced FOV is carried out at to fast rate, hence the observer perceives an effective FOV of 286. Notice, in this example, we used only 3 discrete locations for the BSM to increase the effective FOV from that of only 282 to that of 286 which is about 3 times the reference FOV. In one example, the display 210 with frame rate is $1/t_{fr}$ and the said intermediate pupil has a half-cone divergence angle of $\alpha_{1/2}$. A BSM is located at the said intermediate pupil location that steers the said intermediate pupil into N discrete angular directions around a nominal axis at an interval of $t_{fr}/N$ where N is an integer. The net wide FOV achieved with such dynamic beam steering is $2N\alpha_{1/2}$ as shown by cone angle 286. Even though N is described here as an integer in the formula, in practice, one will have to allow some overlap between adjacent steering locations, to ensure proper image stitching and luminance uniformity across such a tiled image plane.

Even though, the figures show a pupil steering approach, instead of pupil steering, one could make it eyebox-steering display solution for either a wider eyebox size or a dynamically on-demand steered eyebox to enhance efficiency and battery life.

Figure 3A:
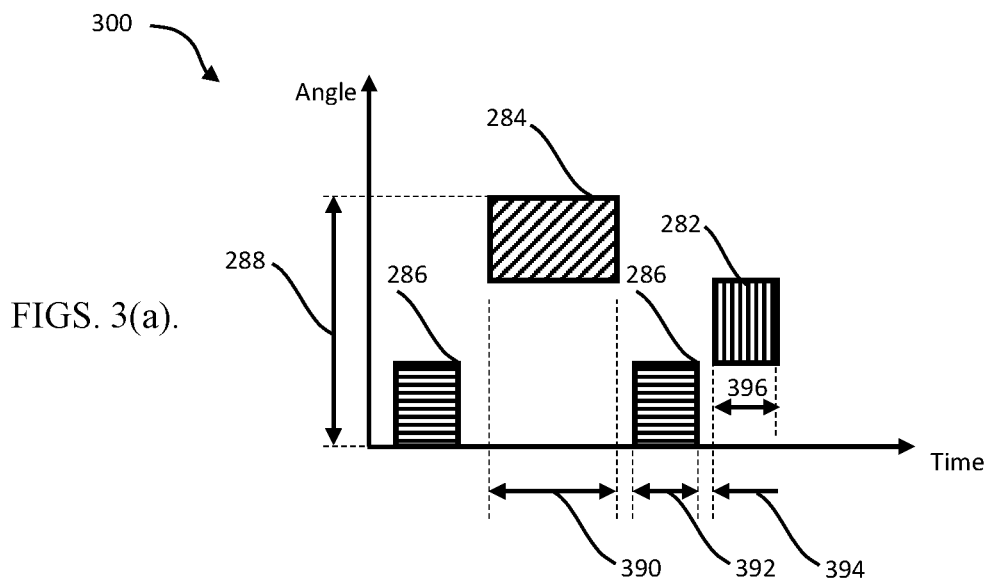
FIG. 3. State-of-the-art Head Mounted Display Timing Diagram.
Figure 3B:
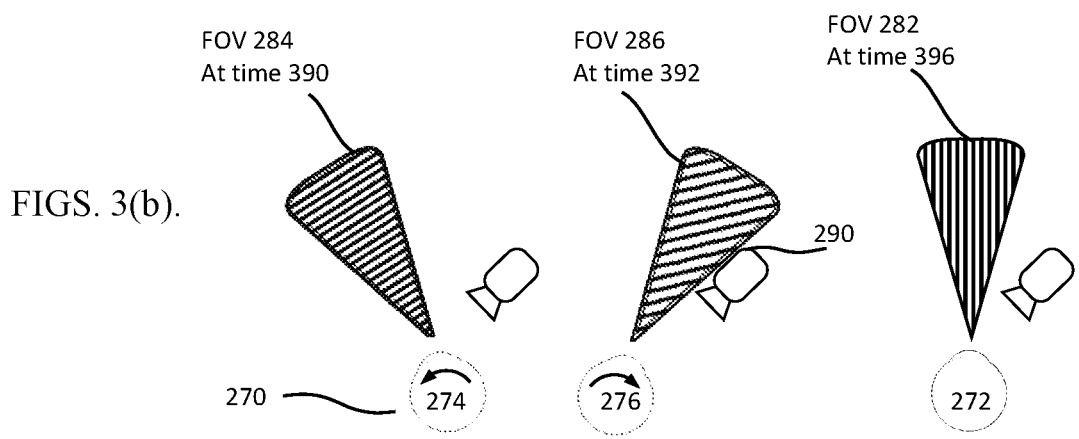
Figure 3C:
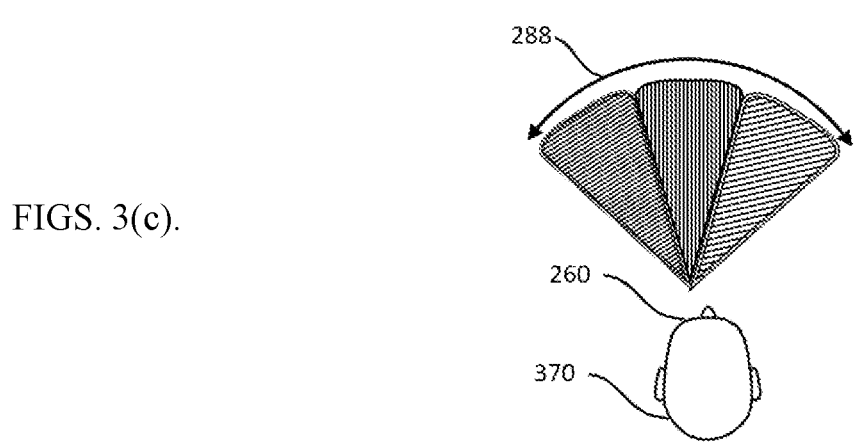

FIG. 3(a). shows state-of-the-art HMD timing diagram showing angular positions 380, 382 and 384 of the BSM during a single frame time of 390. The BSM has a finite dwell time of 392 at a certain angular position and some finite rise/fall settling time of 394. The 3 angular positions combined give us a net WFOV of 386 which is represented by the angular cones shown in FIG. 3(b). The observer 370 sees an effective WFOV of 386 at the exit pupil 360. Note that, although a repetitive angular scan pattern is shown in FIGS. 3(a) and (b), many other scan patterns are possible without deviating from the core principle of this invention.

Figure 4:
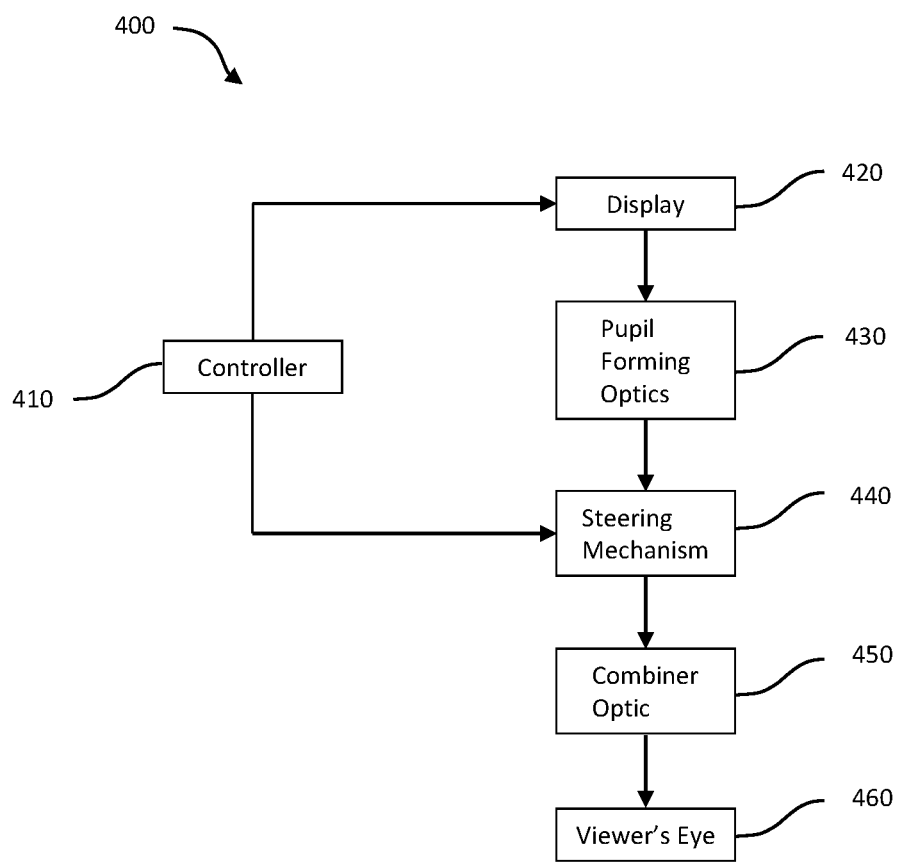
FIG. 4. State-of-the-art Head Mounted Display System block diagram.

FIG. 4. shows state-of-the-art HMD system block diagram. An HMD apparatus 400 consists of a controller 410 which is connected to a display 420 and a BSM 440. The controller 410 provides commands to the BSM 440 to repetitively steer the intermediate pupil into some discrete number of angular positions. The controller 410 also provides appropriate display image data in time domain to the display 420 so that appropriate virtual content is shown at the appropriate angular locations. Once, the BSM 440 has switched its position per the controller command, the display 420 then projects the new direction specific image into the CO 450 which directs it to the viewer's pupil 460. In this manner, such an apparatus 400 enables a time-sequential tiled WFOV HMD architecture.

Figure 5:
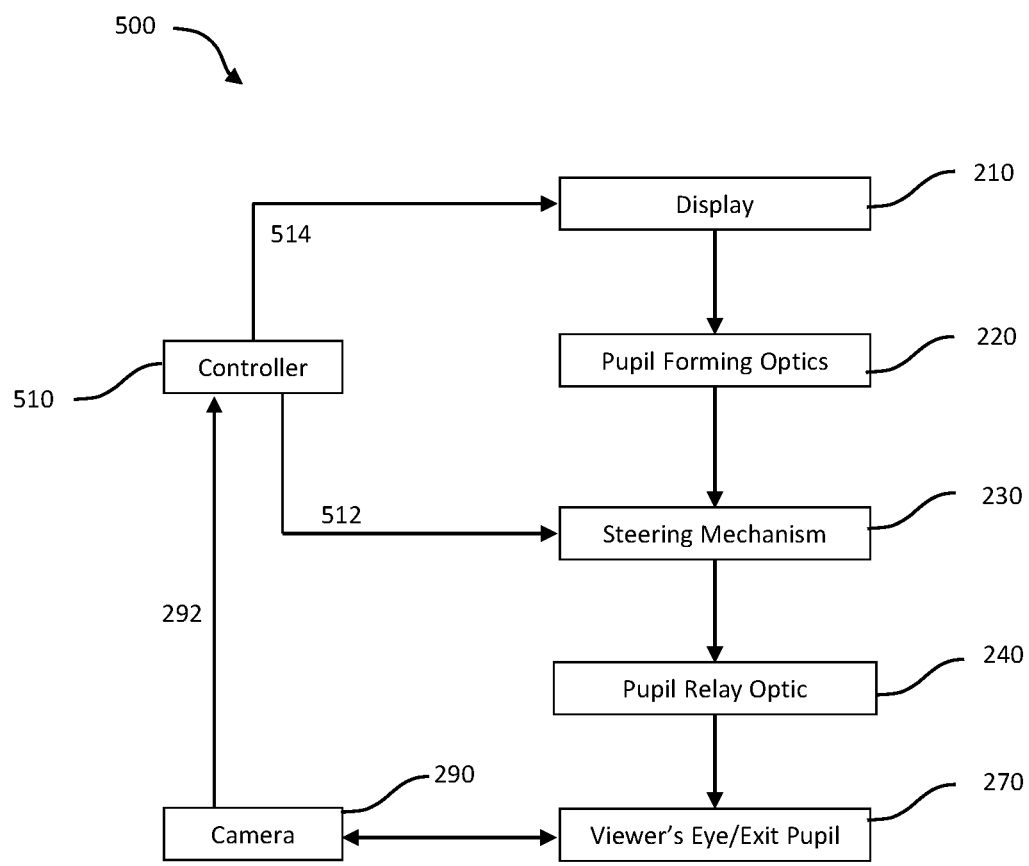
FIG. 5. State-of-the-art Head Mounted Display Gaze controlled Steered FOV System block diagram.

As an alternative, FIG. 5. shows state-of-the-art closed loop HMD system block diagram with Gaze controlled Steered FOV. An HMD apparatus 500 consists of a controller 510 which is connected to a display 520, a BSM 540 and a camera sensor 570. The controller 510 collects information about viewer's gaze direction from the captured image from the camera sensor 570. It then sends a command to the BSM 540 to steer the BSM 540 in the appropriate angular direction of the viewer's gaze. The controller 510 also sends commands to the display 520 to display the proper angle specific virtual image content on the HMD. In this manner, this is a closed loop WFOV HMD system where the FOV is steered on-demand only when the viewer's gaze direction changes. Since, for the majority of the time, an observer's gaze direction doesn't change very frequently, hence such a closed loop system can save a lot of power by only steering the FOV in the desired direction when needed. Such a closed-loop gaze-controlled HMD system, enables a lot of power savings due to limited number of times that a human observer changes gaze. Since the FOV is tied to eye gaze direction in closed loop, the on-demand steering of the FOV enables an effectively wider FOV and still at the expense of relatively low power consumption.

Figure 6:
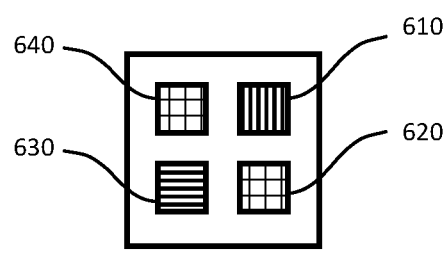
FIG. 6. LED Package showing (a) conventional RGB LED Package and (b) an upgraded LED Package including an IR LED besides the conventional RGB emitter chips.
Figure 6:
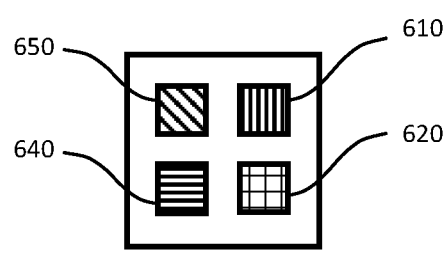

Frame sequential color displays require high field rates to enable multiple color illumination in a time sequential manner. Red, Green and Blue illumination is very common in the form of inorganic semiconductor Light Emitting Diodes. FIG. 6 (a). shows such an LED Package showing (a) conventional RGB LED Package 600 with a Red LED chip 610, two Green LED chips 620 and 640 and a Blue LED chip 630 whereas FIG. 6 (b) shows an upgraded LED Package 602 including an IR LED 650 besides the conventional Red 610, Green 620 and Blue 630 LED emitter chips. Including the IR LED chip 650 in the same semiconductor package allows for a very compact on-axis Bright pupil gaze tracking approach.

Figure 7:
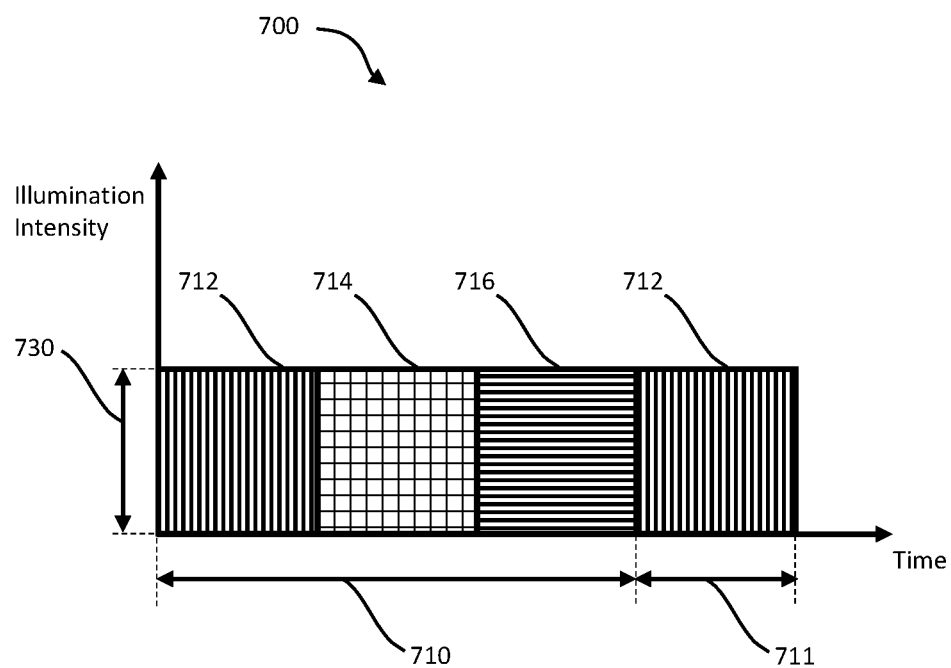
FIG. 7. (a) Conventional RGGB LED timing diagram and (b) an upgraded package RGB-IR LED timing diagram.
Figure 7:
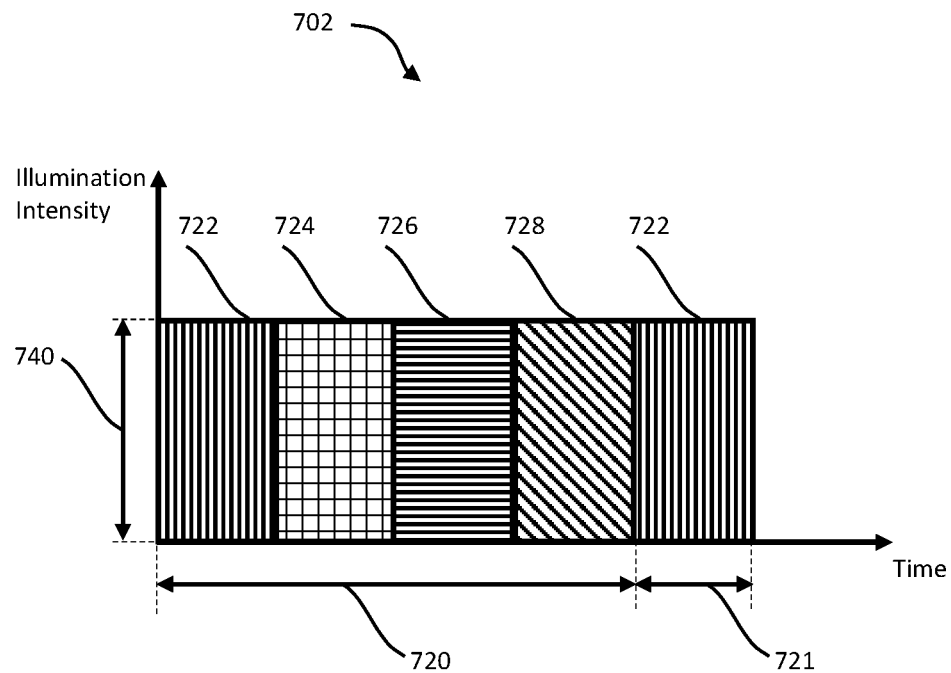

FIG. 7(a) shows conventional RGGB LED timing diagram 700 and FIG. 7(b) shows an upgraded package RGB-IR LED timing diagram 702. In FIG. 7(a), a single frame time of 710, there are 3 fields of equal time duration 711 which represent the Red 712, Green 714 and Blue 716 intensities (arbitrary units). Note, that the product of the illumination intensity 730 and the time duration 711 can be varied to achieve the same net effect for a time-sequential system. In FIG. 7(b), a single frame time of 720, there are now 4 fields of equal time duration 721 which represent the Red 722, Green 724, Blue 726 and Infrared 728 intensities (arbitrary units). Note, that the product of the illumination intensity 740 and the time duration 721 can be varied to achieve the same net effect for a time-sequential system. Although the depiction in FIGS. 7(a) and (b), only shows a single color turned on for illumination at any given time, it is possible to overlap multiple colors for illumination simultaneously including the Infrared source. For such an integrated RGBIR LED package to be properly utilized in an HMD system, it is imperative that the CO and the rest of the optics are properly designed to achieve the simultaneous gaze tracking capability.

Figure 8:
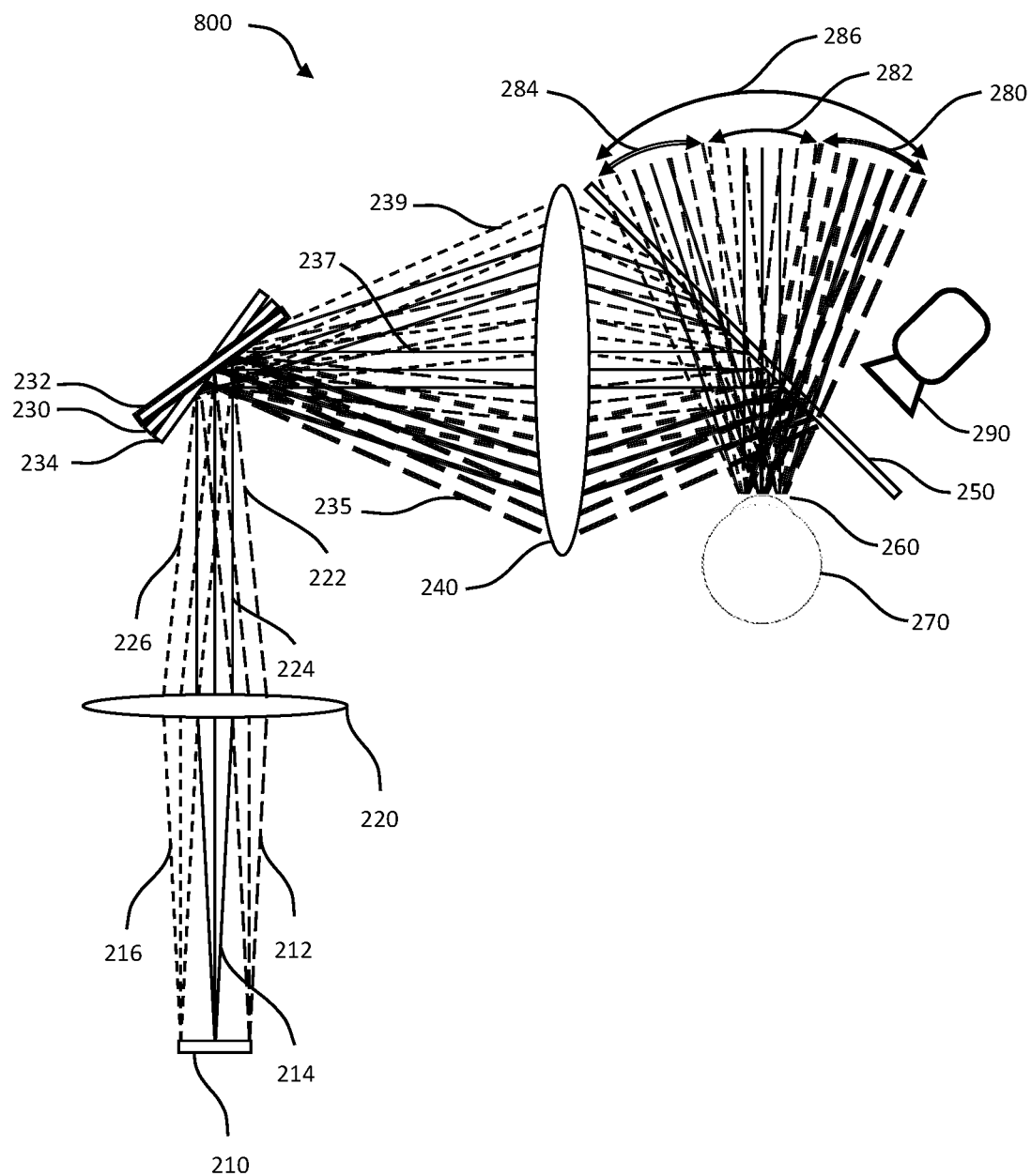
FIG. 8. State-of-the-art Head Mounted Display Optical Architecture.
Figure 9:
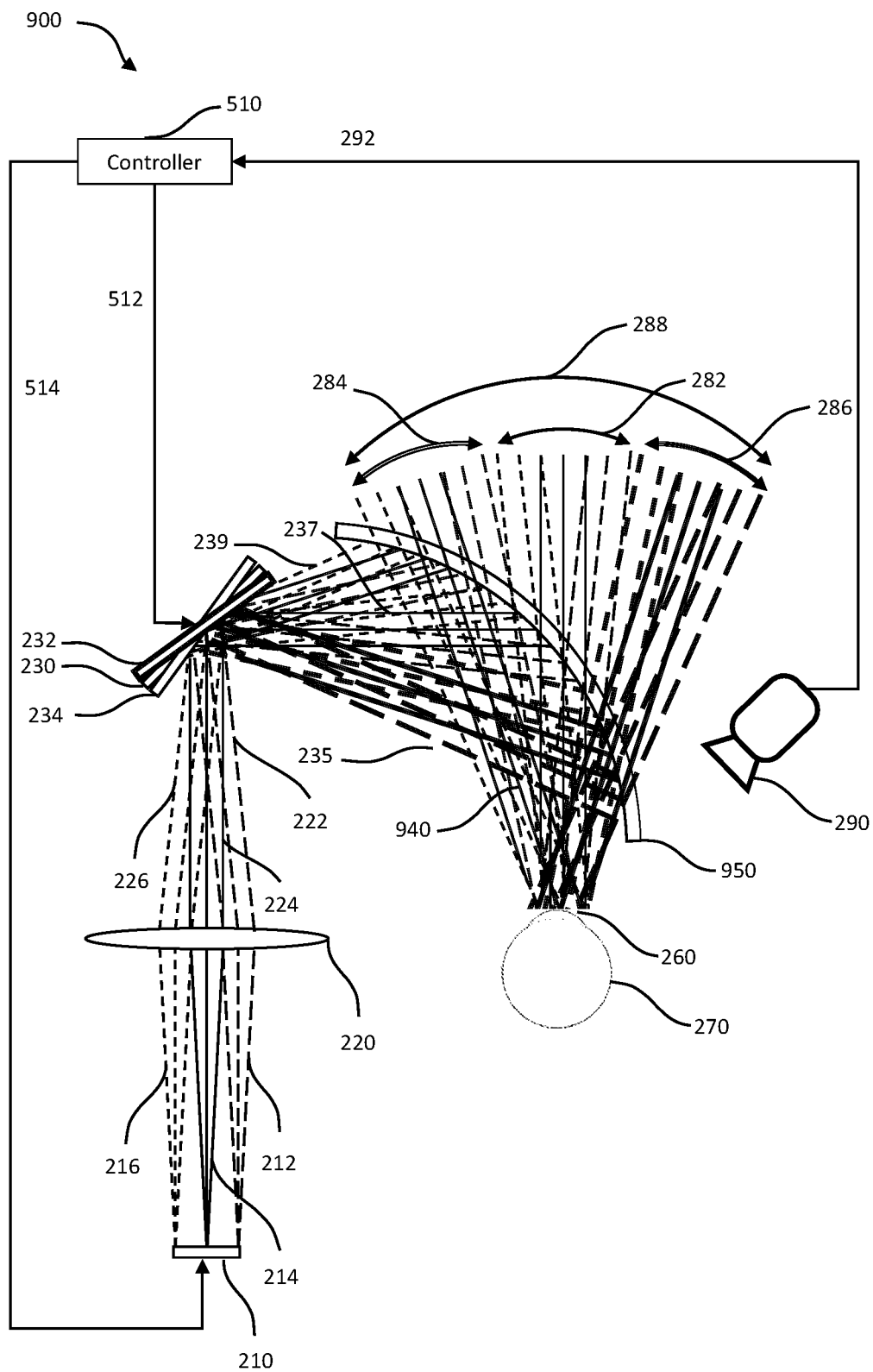
FIG. 9. State-of-the-art Head Mounted Display Optical Architecture including an optically powered combiner optic.

FIG. 8. shows state-of-the-art HMD optical architecture 800 with gaze tracking camera 890 included in the HMD for efficient gaze detection FIG. 9. shows state-of-the-art HMD optical architecture 900 including an optically powered combiner optic 950 included in the HMD for a more compact and efficient optical system. Since the CO 950 is on a thin substrate it doesn't impart any optical power to the real-world scene in transmission mode while at the same time it adds optical power to the reflected image coming from the BSM hence carrying out its functionality as a relay lens.

In one embodiment, an Ambient Light Sensor (ALS) is mounted on the HMD exterior. The ALS provides the ambient light data to the controller which in turn can vary the brightens of the virtual display content in order to make the virtual content's brightness appropriate for the real scene so the two scenes blend naturally.

The ALS can also be used in scenarios where the ambient light increases significantly above a threshold whereby the ambient brightness overshadows the brightness of the virtual display content. In such a case the bit-depth of the virtual display can be decreased to reduce power and hence extend battery life.

In an alternate embodiment, the ALS and controller are also connected to a variable tint control window which is located in front of the observer's eyes. Based on the data from the ALS, the tint of this window can be varied to provide sufficient contrast between the virtual scene and the real scene.

In yet another embodiment, the CO may have its reflection and transmission switched actively in time domain from a low value to a high value. For example, the high reflection will allow high reflectance for the virtual display for the duration needed for sufficient persistence. Whereas during the time when the virtual display is OFF, the CO switches into a mode with high transmittance so that the ambient scene is clearly visible to the user. Such dynamic control of the transmission and reflection will allow for a very efficient performance display solution with long battery life.

In some applications, it is desired to block selective elements from the real scene in order to replace them with virtual content. Such as technology is termed Optical Occlusion. In yet another embodiment, a technology solution is provided for see through optical occlusion via clever use of polarization techniques. Ambient light from the scene is first polarized linearly along a preferred direction. The linearly polarized light from the ambient scene is then routed away from the viewer's eye towards a Spatial Light Modulator (SLM) which selectively removes objects that are to be occluded. The first SLM also rotates the polarization of the real scene image. Another SLM then adds virtual content in place of the occluded real objects. The two SLM's have orthogonal linearly polarized light emerging from them. These orthogonal linearly polarized SLMs are simply combined using reflective polarizers and then routed to the viewer's eye. Such optical see through occlusion enables the virtual content to appear immersive and realistic to the observer.

Since the human eye has radially decreasing resolution in the retina, it is desired to create an SLM with radially addressed resolution for foveal display. Such an SLM will have high resolution in the foveal or gaze direction and gradually lower resolution at radial distances away from the central fovea. The observer's eye may be gaze tracked to determine their gaze location and selectively increase the resolution of the radially addressed display accordingly. Wherever the fovea is not pointed, the display resolution can be decimated by coupling multiple pixels to a single display pixel's luma and chroma value. Radial zones cane be delineated such that right in the middle of the fovea, the display resolution is 1 arc-minute, and as the radial distance a little it away from the fovea, e.g.: 10 degrees from the center of fovea, the resolution is 3 arc-minutes, another zone, e.g.: 20 degrees from the center of the fovea, may have even lower angular resolution such as 6 arc-minutes. Further radial distances away from the fovea, e.g.: >30 degrees from the center of fovea, the resolution is 10 arc-minutes which is the legal limit for visually blind. Such as radially controlled resolution SLM, can save a lot of power by decimating resolution wherever not needed. Furthermore, temporal addressing can also be controlled in zones where a change happens in the scene to be displayed. This will allow for further reduction of the communication bandwidth and hence power savings which enables longer battery life operation.

In another embodiment, the eye glass frame may be designed with various locations for the pupil forming optics and combiner such as in temple, nose bridge, eyebrow etc. to fold the optical system in a compact manner.

In another embodiment, a single display module can be time-multiplexing for the left and the right eyes to reduce size, weight and cost of the optical system. The single display module may utilize two sets of different illumination sources with passive polarization routing optics such as reflective polarizers or volume phase gratings to combine and disperse them to the correct eye in time domain. This module, as example, can be located in the nose bridge of the glasses. This will significantly reduce the cost and weight of the HMD. Compute electronics may be located in the back of the user's head and may snap into the arms of the glasses-headset for the sake of compactness.

In another embodiment, a holographic phase only SLM and an imaging SLM can multiplexed spatially for Wide FOV solution. This can allow for 3D images as the holographic technology provide that inherently.

What is claimed is:

1. An electronic apparatus, comprising:
   a controller that supplies image data at a frame rate of $1/t_{fr}$;
   at least one display comprising:
      a plurality of pixels;
      data lines configured to receive an incoming image in an electronic format;
      and;
      said plurality of pixels configured to display the electronic image in an optical format; and said display being connected to said controller;
   pupil forming optics located at a first distance from the said display that are configured to receive the optical image from said display and form an intermediate pupil located at a second distance away from said pupil forming optics; said intermediate pupil having a half-cone divergence angle of $\alpha_{1/2}$;
   at least one beam steering mechanism located at said intermediate pupil location that steers said intermediate pupil into N discrete angular directions around a nominal axis in at least one dimension at an interval of $t_{fr}/N$ where N is an integer and where $t_{fr}$ is the time period for a single frame of image data;
   said beam steering mechanism being connected to the controller; and
   a combiner optic located at a third distance from said beam steering mechanism, wherein the combiner optic is configured to receive said steered beam of light and redirect said steered beam of light to the viewer's eye where the viewer's eye is located at a fourth distance from said combiner optic.

2. The display defined in claim 1, is chosen from amongst one of the following: Liquid Crystal on Silicon, Micro Electro Mechanical Systems, Digital Light Processing Digital Micromirror Device, Micro Organic Light Emitting Diode, Micro Light Emitting Diode, or Micro Electro Mechanical Systems Resonant Scanning Mirror.

3. The pupil forming optics defined in claim 1, have a focal length equal to the first distance and the second distance.

4. The beam steering mechanism defined in claim 1, is at least a one-dimensional beam steering mechanism.

5. The beam steering mechanism defined in claim 1, is a more than one dimensional beam steering mechanism including piston type analog phase for controlling the dimension of depth.

6. The beam steering mechanism defined in claim 1, is chosen from amongst one of the following: Liquid Crystal Devices, Liquid Crystal on Silicon, Micro Electro Mechanical Systems Electrostatically or Electromagnetically actuated Mirrors, Galvanometric Mirrors, Piezo-Electric-Benders, or Acousto-Optic Modulators.

7. The combiner optic defined in claim 1, comprises at least one of the following: Partially reflective/transmissive mirrors, Partially Reflective Thin Film Coatings, Multilayer Optical Films, Reflective Polarizers, Notch Reflective Polarizers, Bragg Reflective Polarizers, Surface Relief Gratings, Diamond Ruled Gratings, Volume Phase Gratings, Holographic Gratings, Volume multiplexed Holographic Gratings, Angle multiplexed Holographic Gratings, Polarization multiplexed Holographic Gratings, Liquid Crystal Gratings, Polymerized Liquid Crystal Gratings, or any combination thereof.

8. The combiner optic defined in claim 1, have an optical power where it's focal length is equal to half the said third distance.

9. The combiner optic defined in claim 8, where the said third distance is equal to the said fourth distance.

10. The combiner optic defined in claim 1, where the said combiner optic has a switchable tint control mechanism.

11. The electronic apparatus defined in claim 1, is a head mounted display.

12. An electronic apparatus, comprising:
a controller that supplies image data at a frame rate of $1/t_{fr}$ where $t_{fr}$ is the time period for a single frame of image data;
at least one display comprising a plurality of pixels and data lines configured to receive an incoming image in an electronic format;
pupil forming optics located at a first distance from said display that are configured to receive the image from said display and form an intermediate pupil located at a second distance away from said pupil forming optics;
at least one beam steering mechanism located at said intermediate pupil location that steers said intermediate pupil into continuously steered angular directions around a nominal axis in at least one dimension;
a combiner optic located at a third distance from said beam steering mechanism, wherein the combiner optic is configured to receive said steered beam of light and redirect said steered beam of light to the viewer's eye where the viewer's eye is located at a fourth distance from said combiner optic.

13. The apparatus defined in claim 12, includes a camera sensor connected to the controller.

14. The camera defined in claim 13, is a monochrome camera sensor.

* * * * *